(12) United States Patent  
Watanabe

(10) Patent No.: US 8,411,101 B2  
(45) Date of Patent: Apr. 2, 2013

(54) PREVIEW DATA GENERATING APPARATUS, METHOD TO GENERATE PREVIEW DATA, AND COMPUTER USABLE MEDIUM THEREFOR

(75) Inventor: Takeshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1081 days.

(21) Appl. No.: 12/372,412

(22) Filed: Feb. 17, 2009

(65) Prior Publication Data
US 2009/0249201 A1 Oct. 1, 2009

(30) Foreign Application Priority Data

Mar. 31, 2008 (JP) .................................. 2008-092571

(51) Int. Cl.
*G09G 5/02* (2006.01)
(52) U.S. Cl. ........................................ 345/589; 358/527
(58) Field of Classification Search .................. None
See application file for complete search history.

(56) References Cited

U.S. PATENT DOCUMENTS

| 5,521,722 | A | 5/1996 | Colvill et al. |
| 5,839,837 | A | 11/1998 | Takehara |
| 2004/0027416 | A1* | 2/2004 | Rosenberger et al. ........... 347/43 |
| 2007/0201062 | A1 | 8/2007 | Watanabe |
| 2009/0161136 | A1* | 6/2009 | Li et al. ........................ 358/1.13 |

FOREIGN PATENT DOCUMENTS

| JP | A-5-83527 | 4/1993 |
| JP | A-9409479 | 4/1997 |
| JP | A-10-70665 | 3/1998 |
| JP | A-10-191078 | 7/1998 |
| JP | A-2002-46303 | 2/2002 |
| JP | A-2004-112535 | 4/2004 |
| JP | A-2004-287042 | 10/2004 |
| JP | A-2005-103762 | 4/2005 |
| JP | A-2007-228316 | 9/2007 |

OTHER PUBLICATIONS

Feb. 28, 2012 Office Action issued in Japanese Application No. 2008-092571 (with translation).
Oct. 24, 2012 European Search Report (including Search Opinion) issued in European Patent Application No. 09002762.4.

* cited by examiner

*Primary Examiner* — Kee M Tung
*Assistant Examiner* — Ryan D McCulley
(74) *Attorney, Agent, or Firm* — Oliff & Berridge, PLC

(57) ABSTRACT

A preview data generating apparatus to generate preview data, which is used to display a preview image representing an image to be printed on a recording medium, in reflection of a color of the recording medium, is provided. The preview data generating apparatus includes a base color input unit to input a base color being the color of the recording medium, a print data input unit to input print data in a printable format, which is used to print the image, a data conversion unit to convert the print data into a displayable format suitable for a display device, and a base color incorporated data generating unit to generate the preview data representing the image to be printed by incorporating the displayable-formatted data and the base color.

12 Claims, 17 Drawing Sheets

COLOR CONVERSION TABLE — 161

| sRGB SCALE VALUE | | | CMYK SCALE VALUE | | | |
|---|---|---|---|---|---|---|
| R | G | R | C | M | Y | K |
| 0 | 0 | 0 | 0 | 0 | 0 | 0 |
| 64 | 0 | 0 | 0 | 32 | 45 | 0 |
| 128 | 0 | 0 | 0 | 101 | 123 | 0 |
| 192 | 0 | 0 | 0 | 190 | 210 | 0 |
| 255 | 0 | 0 | 0 | 255 | 250 | 0 |
| 0 | 64 | 0 | 50 | 23 | 10 | 10 |
| 64 | 64 | 0 | 100 | 32 | 45 | 35 |
| 128 | 64 | 0 | 80 | 62 | 70 | 55 |
| 192 | 64 | 0 | 20 | 102 | 190 | 15 |
| 255 | 64 | 0 | 0 | 180 | 250 | 0 |
| ... | ... | ... | ... | ... | ... | ... |
| 0 | 192 | 255 | 255 | 20 | 0 | 0 |
| 64 | 192 | 255 | 190 | 21 | 0 | 0 |
| 128 | 192 | 255 | 128 | 31 | 0 | 0 |
| 192 | 192 | 255 | 54 | 25 | 0 | 0 |
| 255 | 192 | 255 | 0 | 20 | 0 | 0 |
| 0 | 255 | 255 | 255 | 10 | 0 | 0 |
| 64 | 255 | 255 | 198 | 2 | 0 | 0 |
| 128 | 255 | 255 | 130 | 0 | 0 | 0 |
| 192 | 255 | 255 | 55 | 0 | 0 | 0 |
| 255 | 255 | 255 | 0 | 0 | 0 | 0 |

| PRINT DATA | | |
|---|---|---|
| STARTING BYTE | BYTE(S) OCCUPIED | REMARKS |
| 0 | 3 | 0th Byte : R of base color<br>1st Byte : G of base color<br>2nd Byte : B of base color |
| 3 | | PRINT CONTENTS |

FIG.22

PREVIEW DATA GENERATING APPARATUS, METHOD TO GENERATE PREVIEW DATA, AND COMPUTER USABLE MEDIUM THEREFOR

CROSS REFERENCE TO RELATED APPLICATION

This application claims priority from Japanese Patent Application No. 2008-092571, filed on Mar. 31, 2008, the entire subject matter of which is incorporated herein by reference.

BACKGROUND

1. Technical Field

Aspects of the present invention relate to a preview data generating apparatus, a method to generate preview data, and a computer usable medium therefore, and more specifically, to an apparatus, a method, and a computer usable medium to generate preview data, by which preview of an image to be printed in white ink can be presented.

2. Related Art

Conventionally, an inkjet printing apparatus, which ejects a plurality of colors of inks and white ink onto a recording medium, has been known. In the inkjet printing apparatus, the inks are drawn from ink reservoirs to a plurality of ejecting channels provided in an inkjet head and ejected from nozzles at the end of the ejecting channels when actuators such as heater elements and piezoelectric elements are selectively activated. When an image is formed in colors, each of pixels composing the image is resolved, for example, into the three primary colors, which are cyan (C), magenta (M), and yellow (Y), thereafter, a colored pixel is formed as the inks adjusted in their densities are ejected onto the recording medium. In addition, a pixel in black can be reproduced by blending the colored inks or using black (K) ink. Further, white (W) ink can be used to reproduce white pixels and to form a base layer on a dark-colored (i.e., black) recording medium so that pixels in other colors can be reproduced clearly over the base layer regardless of a color of the recording medium. Thus, images reproduced in higher quality can be obtained without being limited by colors and lightness of the recording media.

For the inkjet printer capable of printing in white, various methods to eliminate an effect of a color of the recording medium, which is substantially a background color of the printed image, have been suggested. For example, according to a method disclosed in Japanese Patent Provisional Publication No. 2002-46303, an image represented in RGB color format is logically inversed, and the white base layer is formed according to the inversed image data. Thereafter, the original image is formed on the base layer, i.e., the inversed image. For another example, in a method disclosed in Japanese Patent Provisional Publication No. 2005-103762, the image data is converted into grayscale data prior to a printing operation, and discharge printing is performed on the recording medium based on the inverted image.

In order to take the effect of the background color into consideration, a printing apparatus which presents a preview image including a composed background color is suggested in, for example, Japanese Patent Provisional Publication No. H09-109479 (hereinafter referred to as '479 Publication). For another example, an image forming apparatus to compose print data based on logical addition of captured image data and preliminarily stored background data is disclosed in Japanese Patent Provisional Publication No. H05-83527 (hereinafter referred to as '527 Publication).

SUMMARY

In the preview image presented by the printing apparatus disclosed in the '479 Publication, the image to be printed is combined with the background, which is merely replacement of a transparent area having no color information with the background color. Therefore, the image according to the preview data is not affected by the underneath background color. According to the '527 Publication, the print data is generated based on the logical addition of the background color and self-colors of the image, but coloration of the white ink as the base layer and the colored inks in addition to the color of the recording medium is not considered in the preview image.

In view of the above drawbacks, the present invention is advantageous in that a preview data generating apparatus, a method to generate preview data, and a computer usable medium therefore to generate preview data of an image to be printed, in which coloration of arbitrarily designated color information of the recording medium is affected to the print data, are provided.

According to an aspect of the invention, a preview data generating apparatus to generate preview data, which is used to display a preview image representing an image to be printed on a recording medium, in reflection of a color of the recording medium, is provided. The preview data generating apparatus includes a base color input unit to input a base color being the color of the recording medium, a print data input unit to input print data in a printable format, which is used to print the image, a data conversion unit to convert the print data into a displayable format suitable for a display device, and a base color incorporated data generating unit to generate the preview data representing the image to be printed by incorporating the displayable-formatted data and the base color.

According to another aspect of the invention, a method to generate preview data, which is to be used to display a preview image representing an image to be printed on a recording medium, in reflection of a color of the recording medium, is provided. The method included inputting a base color being the color of the recording medium, inputting print data in a printable format, which is used to print the image, converting the print data into a displayable format suitable for a display device, and generating the preview data representing the image to be printed by incorporating the displayable-formatted data and the base color.

According to still another aspect of the invention, a computer usable medium to comprise computer readable instructions to control a computer to generate preview data, which is to be used to display a preview image representing an image to be printed on a recording medium, in reflection of a color of the recording medium, is provided. The computer readable instructions control the computer to execute steps of inputting a base color being the color of the recording medium, inputting print data in a printable format, which is used to print the image, converting the print data into a displayable format suitable for a display device, and generating the preview data representing the image to be printed by incorporating the displayable-formatted data and the base color.

According to the above configurations, coloration of the base color being the color of the recording medium can be reflected in the preview data representing the image to be printed on the recording medium. Therefore, coloration of the preview image displayed according to the preview data is more closely resembled to coloration of an actually printed image.

BRIEF DESCRIPTION OF THE ACCOMPANYING DRAWINGS

FIG. 9 illustrates a data configuration of a color conversion table according to the first embodiment of the present invention.

FIG. 22 illustrates configuration of the print data according to the sixth embodiment of the present invention.

DETAILED DESCRIPTION

Hereinafter, embodiments according to aspects of the present invention will be described with reference to the accompanying drawings.

Figure 1:
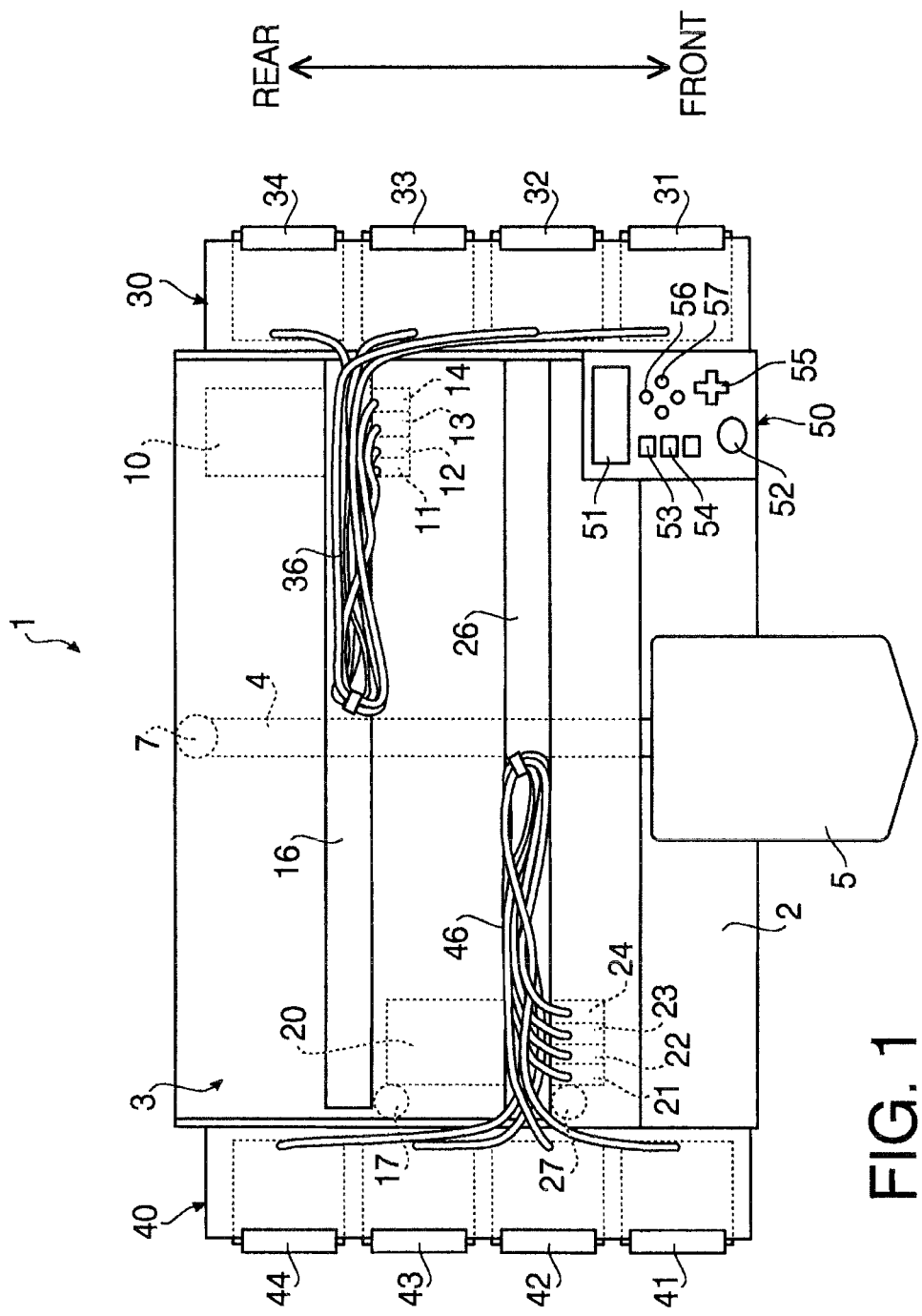
FIG. 1 is a plane view of an inkjet printer according to a first embodiment of the present invention.

An inkjet printer 1 according to a first embodiment of the present invention will be described with reference to FIG. 1. The inkjet printer 1 is a known printing apparatus, which is capable of printing an image on a recording medium such as a piece of fabric. FIG. 1 is a plane view of the inkjet printer 1 according to the first embodiment of the present invention.

As shown in FIG. 1, the inkjet printer 1 includes a flat base plate 2 at a bottom and a cover 3 to cover the entire body of the inkjet printer 1. The base plate 2 has longer sides which extend in a right-and-left (horizontal) direction in FIG. 1, and a rail 4 is aligned in parallel with a front-rear direction as indicated by an arrow at an approximate center of the base plate 2. The rail 4 supports a platen 5, which is interchangeable and movable in the front-rear direction (i.e., an auxiliary direction) along the rail 4.

The platen 5 is carried along the rail 4 by a platen drive motor 7 being a stepping motor, which is provided at a rear end portion of the rail 4. The platen 5 is formed to have a substantially rectangular-shaped plate, on which a recording medium (e.g., a T-shirt) is placed in a printable posture.

At an approximately center but a relatively rear (i.e., closer to an upper side in FIG. 1) of the cover 3, above the platen 5, a first guide rail 16 to guide a first carriage 10 with four inkjet heads 11-14 mounted thereon is provided. In the vicinity of a left-hand end of the first guide rail 16, a first carriage motor 17 to drive the first carriage 10 is provided, while a pulley (not shown) is provided in the vicinity of a right-hand end of the first guide rail 16. Further, a carriage belt (not shown) is drawn between the first carriage motor 17 and the pulley under the first guide rail 16. The carriage belt is fixed to the first carriage 10 so that the first carriage 10 is reciprocated along the first guide rail 16 in the right-and-left direction (i.e., a main scanning direction) when the carriage motor 17 is activated. The carriage motor 17 is a DC motor, by which a position of the first carriage 10 on the guide rail 16 is detectable based on output signals from a linear encoder (not shown) provided to the guide rail 16.

On the right-hand end of the cover 3, a first ink cartridge storage 30, in which four ink cartridges 31-34 having inks therein are detachably attached, is provided. Each of the ink cartridges 31-34 is connected to each of inkjet heads 11-14 by flexible ink supplying tubes 36 so that the inks stored in the ink cartridges 31-34 are supplied to each channel of the inkjet heads 11-14. According to the present embodiment, all of the inkjet heads 11-14 are provided to discharge white ink therefrom, and the ink cartridges 31-34 respectively contain white ink.

At an approximately center but a relatively front (i.e., closer to a lower side in FIG. 1) portion of the cover 3, above the platen 5, a second guide rail 26, in parallel with the first guide rail 16, to guide a second carriage 20 with four inkjet heads 21-24 mounted thereon is provided. Further, a carriage belt (not shown) is drawn between the second carriage motor 27 and a pulley (not shown) under the second guide rail 26. The carriage belt is fixed to the second carriage 20 so that the second carriage 20 is reciprocated along the second guide rail 26 in the right-and-left direction (i.e., the main scanning direction) when the carriage motor 27 is activated.

In a left-end portion of the cover 3, a second ink cartridge storage 40, in which four ink cartridges 41-44 are stored, is provided. The ink cartridges 41-44 are respectively connected to the inkjet head 21-24 through ink supplying tubes 46 so that the inks in the ink cartridges 41-44 are supplied to each channel of the inkjet heads 21-24. The four ink cartridges 41-44 contain cyan (C) ink, magenta (M) ink, yellow (Y) ink, and black (K) ink respectively.

Each of the inkjet heads 11-14 in the first carriage 10 and the inkjet heads 21-24 in the second carriage 20 is provided with a plurality of (for example, 128) ejection channels (not shown) through which the ink is conveyed. Each of the channels is provided with a piezoelectric actuator (not shown), which is activated individually, to discharge an ink drop downward onto the recording medium from ejection nozzles (not shown) that are open at a nozzle surface of each of the inkjet heads 11-14, 21-24. Further, at one of the right-hand end and the left-hand end of the reciprocative range of each of the first and second carriages 10, 20, a maintenance mechanism (not shown) such as a capping unit and a purge unit for the inkjet heads 11-14, 21-24 is provided.

At right-hand front of the inkjet printer 1 is provided an operation panel 50 through which a user inputs an instruction for the inkjet printer 1. The operation panel 50 includes a display 51, a print start button 52, a print cancel button 53, and a platen feed button 54, a direction key 55, an error indicator 56, and a data reception indicator 57. The display 51 is to display various information concerning, for example, operations in the inkjet printer 1. The print start button 52 is a button to be operated when a print operation is started. The cancel button 53 is a button to be operated when the print operation is ceased. When the platen feed button 54 is operated, the platen 5 is moved to a position wherein the fabric such as a T-shirt as the recording medium can be set on and removed from the platen 5. The direction key 55 is operated when, for example, the user selects an option concerning operations to be executed. The error indicator is a lamp to be lit when an error occurs in the inkjet printer 1. The data reception indicator 57 is a lamp to be lit when print data is received in the inkjet printer 1.

Figure 2:
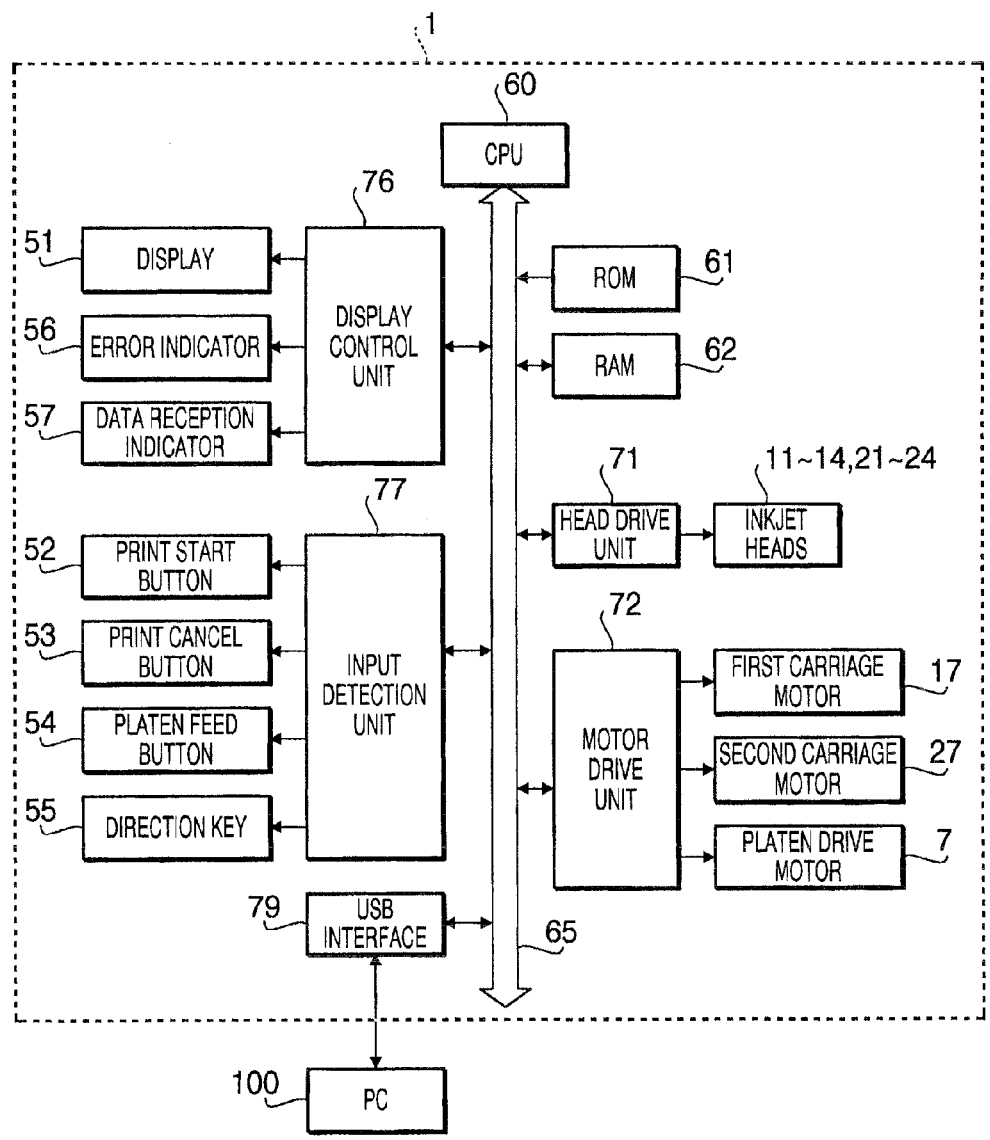
FIG. 2 is a block diagram to illustrate an electrical configuration of the inkjet printer according to the first embodiment of the present invention.

Next, referring to FIG. 2, an electrical configuration of the inkjet printer 1 will be described. FIG. 2 is a block diagram showing the electrical configuration of the inkjet printer 1 according to the present embodiment of the invention. As shown in FIG. 2, the inkjet printer 1 is provided with a CPU 60 that controls the entire operation in the inkjet printer 1. The CPU 60 is connected with a ROM 61, a RAM 62, a head drive unit 71, a motor drive unit 72, a display control unit 76, an input detection unit 77, and a USB interface 79. These components are connected to one another through a bus 65.

The ROM 61 includes a program storage area, wherein control programs to be executed by the CPU 60 to control operations of the inkjet printer 1 and printing programs to be executed for the printing operations are stored, and a program-related information storage area, wherein various information such as parameter settings, initial values, and data to be used in the programs are stored. Further, the ROM 61 may include various storage areas.

The RAM 62 in the inkjet printer 1 is provided with several areas including a received print data storing area for storing the print data transmitted from a PC 100, an in-printing data storing area for storing the print data being printed, and various information storing areas for storing various setting information.

The head drive unit 71 is connected to each of the inkjet heads 11-14, 21-24 and activates the piezoelectric actuators being provided to each channel of the inkjet heads 11-14, 21-24.

The motor drive unit 72 is connected to the first carriage motor 17, the second carriage motor 27, and a platen drive motor 7, which drives a platen roller (not shown) to adjust timing and speed to feed the platen 5 holding the fabric as a recording medium. Thus, the first and the second carriage motors 17, 27, and the platen drive motor 7 are controlled by the motor drive unit 72.

The display control unit 76 executes displaying processes of the display 51, the error indicator 56, and the data reception indicator 57, which are connected to the CPU 60 through the bus 65. The input detection unit 77 detects inputs through the print start button 52, the print cancel button 53, the platen feed button 54, and the direction key 55, which are connected to the CPU 60 through the bus 65. The USB interface 79 which allows communication between the inkjet printer 1 and external devices including the PC 100 through a USB cable (not shown).

With the aforementioned configuration of the inkjet printer 1 according to the embodiment, when the print data transmitted from the PC 100 is received in the inkjet printer 1, the user sets a piece of fabric on the platen 5 and presses the print button 52. Accordingly, the platen 5 with the fabric is moved to rearward in the cover 3 of the inkjet printer 1 along the rail 4 by the platen drive motor 7 so that the position of the first carriage 10 with respect to the platen 5 corresponds to a recording start position. Thereafter, the inkjet heads 11-14 eject the inks as the first carriage 10 is moved from the right-hand side to the left-hand side in the cover 3 according to a recording instruction so that recording of one line is executed. Further, the platen 5 is moved to frontward from the rearward in the cover 3 for an amount corresponding to one line, and the inkjet heads 11-14 eject the inks as the first carriage 10 is moved from the right-hand side to the left-hand side in the cover 3 according to the recording instruction so that recording of the next line is executed. Subsequently, the platen 5 is moved to frontward from the rearward in the cover 3 for the amount corresponding to another one line portion. By repeating this operation, printing in white ink is executed. Next, the inkjet printer 1 moves the platen 5 with the fabric to frontward so that the position of the second carriage 20 with respect to the platen 5 corresponds to the recording start position. The second carriage 20 is driven similarly to the first carriage 10 as described above so that the colored (CMYK) inks are ejected onto the fabric according to the recording instruction. At the end of the printing operation, the platen 5 is fed forth to a removable position wherein the fabric can be removed, thus the user removes the fabric which underwent the printing operation.

Figure 3:
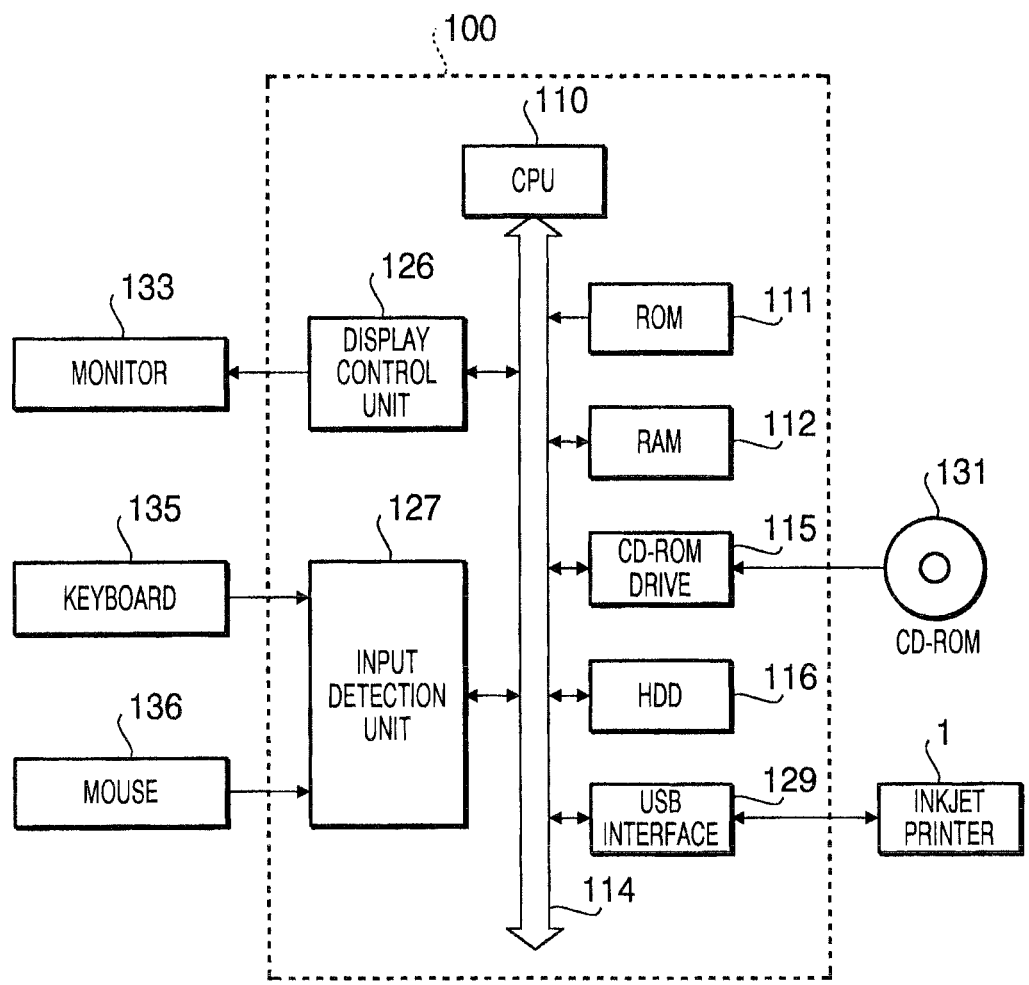
FIG. 3 is a block diagram to illustrate an electrical configuration of a PC (personal computer) according to the first embodiment of the present invention.
Figure 4:
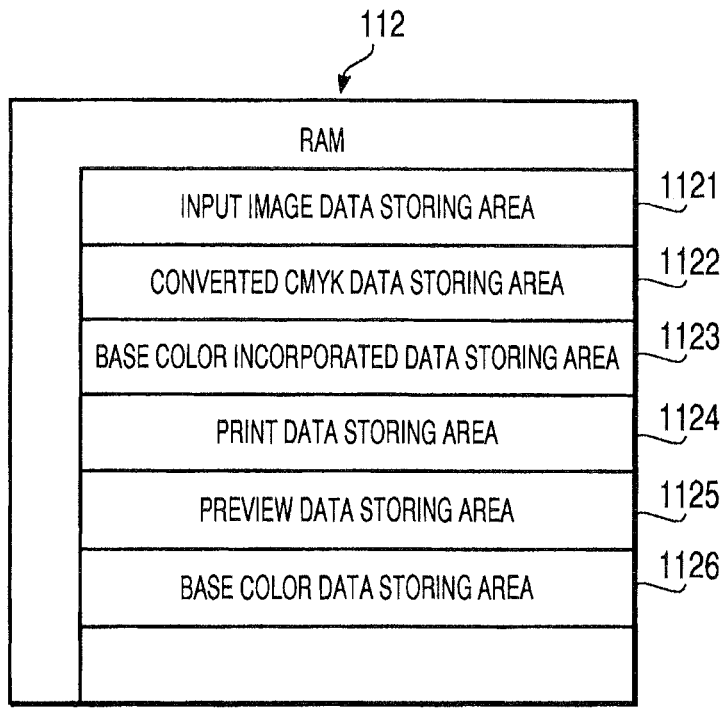
FIG. 4 is a schematic diagram of a RAM (random access memory) in the PC according to the first embodiment of the present invention.
Figure 5:
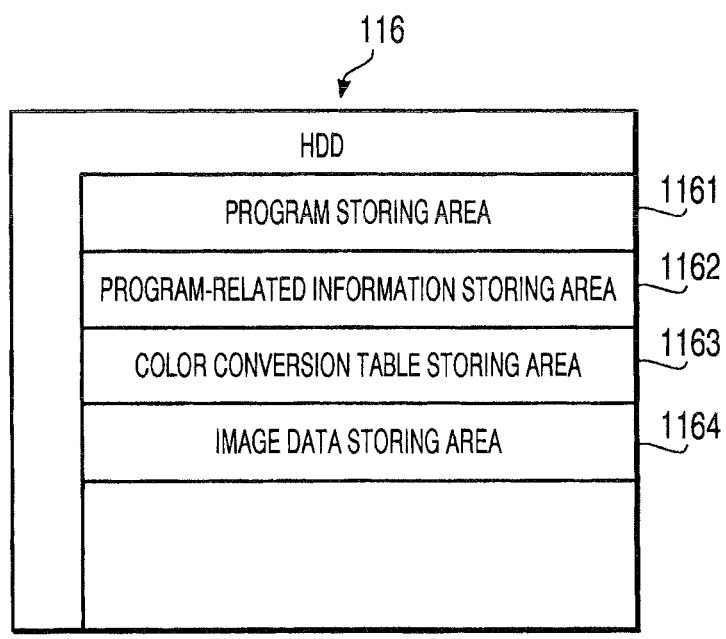
FIG. 5 is a schematic diagram of an HDD (hard disk drive) in the PC according to the first embodiment of the present invention.

Next, a configuration of the PC 100 will be described with reference to FIGS. 3-5. FIG. 3 is a block diagram of an electrical configuration of the PC 100 according to the present embodiment of the invention. FIG. 4 is a schematic diagram of a RAM 112 in the PC 100 according to the present embodiment of the invention. FIG. 5 is a schematic diagram of an HDD 116 in the PC 100 according to the present embodiment of the invention. The PC 100 is connected to the inkjet printer 1 through a standardized communication cable, which is for example a USB. In the PC 100, print data is generated based on image data created by the user using various applications, and the print data is transmitted to the inkjet printer 1.

As shown in FIG. 3, the PC 100 is provided with a CPU 110 which controls the entire operation in the PC 100. The CPU 110 is connected with a ROM 111, a RAM 112, a CD-ROM drive 115, an HDD 116, a display control unit 126, an input detection unit 127, and a USB interface 129. These components are connected to one another through a bus 114.

The ROM 111 stores various information to be used in controlling programs, such as BIOS, to be executed by the CPU 110. The CD-ROM drive 115 is for reading data from a CD-ROM 131 inserted therein as a storage medium of data.

The CD-ROM 113 stores data including a printer driver, which is a program to create the print data, and various settings, tables, and data to be used in the program. The data in the CD-ROM 113 is read by the CD-ROM drive 115 and stored in predetermined areas (see FIG. 5) in the HDD 116.

The display control unit 126 controls displaying processes to display information concerning an operation on a screen of a monitor 133. The input detection unit 127 is connected to input devices including a keyboard 135 and a mouse 136, which are operated by the user, and operations by the user to the input devices are detected by the input detection unit 127. The USB interface 129 allows communication between the PC 100 and external devices including the inkjet printer 1 through a USB cable (not shown).

As shown in FIG. 4, the RAM 112 is provided with several storage areas including an inputted image data storing area 1121, a converted CMYK data storing area 1122, a base color incorporated data storing area 1123, a print data storing area 1124, a preview data storing area 1125, and a base color data storing area 1126. The inputted image data storing area 1121 is a storage area for temporarily storing originally inputted image data. The print data for printing an image is created based on the originally inputted image data being stored in the inputted image data storing area 1121. The converted CMYK data storing area 1122 is a storage area for storing converted CMYK data, which is converted from the inputted image data 141. The converted CMYK data is used when W data, indicating scale values of white in the image to be printed, is created. The base color incorporated data storing area 1123 is a storage area for storing 256-scaled base color incorporated data, in which color information of the originally inputted image is processed to be suitable to a color of the recording medium. The print data storing area 1124 is a storage area for storing binary-formatted print data, which is created based on the data stored in the base color incorporated data storing area 1123. Functions of the above-mentioned data in the RAM 112 will be described later in detail.

As shown in FIG. 5, the HDD 116 contains several storage areas including a program storing area 1161, a program-related information storing area 1162, a color conversion table storing area 1163, and an image data storing area 1164. The program storing area 1161 is a storage area for storing various programs to be executed in the PC 100 including the printer driver. The program-related information storing area 1162 is a storage area for storing information concerning settings, initial values, and data necessary for executing the programs. The color conversion table storing area 1163 is a storage area for storing a color conversion table 161 (see FIG. 9). The color conversion table 161 defines correspondence between color information of the inputted image data, which is represented in RGB (red, green, blue) format, and a colored ink level, which is represented in a CMYK format. The color conversion table 161 is thus used for converting the inputted image data into a colored ink level in CMYK format. The image data storing area 1164 is a storage area for storing a plurality of pieces of image data.

Next, a method to generate preview data, which represents preview image of the image to be printed according to the print data, will be described. In the present embodiment, the print data to be used in the inkjet printer 1 is generated in the PC 100 in binary-formatted CMYKW data. The preview data is a piece of data to display a preview image representing a prospective view of a printed image, in which coloration of the color information in the print data and an arbitrarily designated base color of the recording medium are reflected, on the screen of the monitor 133.

Figure 6:
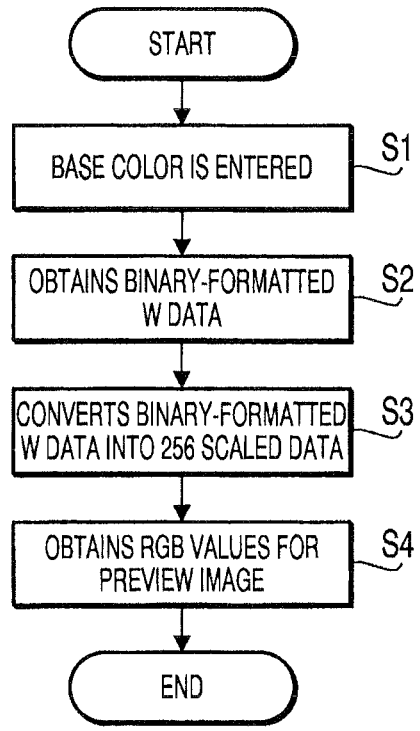
FIG. 6 is a flowchart to illustrate a preview data generating process to be executed in the PC according to the first embodiment of the present invention.
Figure 7:
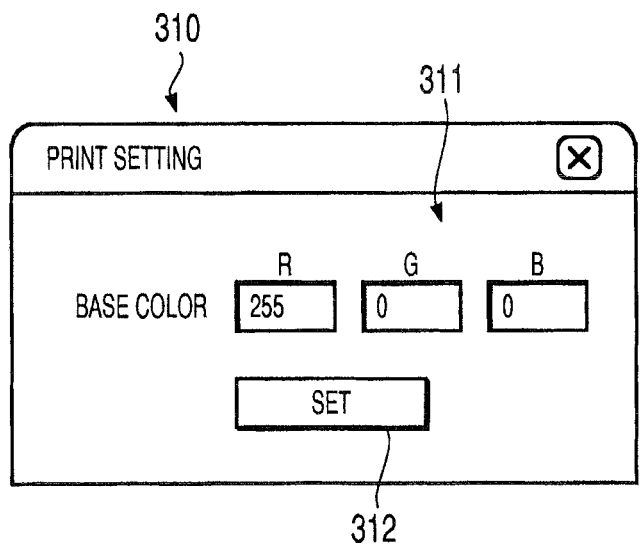
FIG. 7 illustrates a window to be displayed on the monitor screen of the PC according to the first embodiment of the present invention.

The preview data to be created according to the first embodiment of the present invention will be described with reference to FIGS. 6 and 7. FIG. 6 is a flowchart to illustrate a preview data generating process to be executed in the PC 100 according to the first embodiment of the present invention. FIG. 7 illustrates a print setting window 310 to be displayed on the monitor screen of the PC 100 according to the first embodiment of the present invention. When the preview data generating process starts, in S1, a color of a base layer (i.e., a color of the recording medium) is entered through the print setting window 310 displayed by the printer driver on the screen of the monitor 133. The print setting window 310 includes RGB fields 311, in which a color of the base layer can be entered in RGB scale values ranging from 0 to 255. The RGB scale values representing the base color and entered in the RGB fields 311 are respectively referred to as Ur, Ug, and Ub. The print setting window 310 further includes a print set button 312. The print setting window 310 is closed after Ur, Ug, and Ub are entered, and the user operates the print set button 312. The process proceeds to S2.

Next, in S2, binary-formatted W scale values among the CMYKW data in the print data are obtained. In S3, the obtained binary-formatted W data is converted into 256-scaled W data, which is a displayable format for the monitor 133. More specifically, a number of the binary-formatted W dots included in a plane divided in 8×8 (a dot being an inverse of a resolution of the image) is counted. The counted value is multiplied by 255/64. Thus, the 256-scaled W data is obtained. Thereafter, in S4, the RGB values of the base color (Ur, Ug, Ub) entered in S1 and the 256-scaled W data obtained in S3 are applied to the following formulae 1 in order to obtain RGB data for a preview image:

$$Wr = Ur\frac{255-w}{255} + W \quad \text{(Formulae 1)}$$

$$Wg = Ug\frac{255-w}{255} + W$$

$$Wb = Ub\frac{255-w}{255} + W$$

The obtained Wr, Wg, Wb values are used to be the preview data to display the preview image on the screen of a monitor 133. Thus, the preview data representing a preview image, in which coloration of the designated color information of the recording medium is affected to the print data, is achieved. Specifically, according to the above formulae, when a 256-scaled W value of a pixel in the print data is at maximum (i.e., 255), a corresponding pixel in the preview data is represented in maximum whiteness. As the 256-scaled W value of a pixel in the print data diminishes, a corresponding pixel in the preview data is represented in whiteness closer to the color of the recording medium, and when the 256-scaled W value is at minimum (i.e., 0), a corresponding pixel in the preview data is represented in the color of the recording medium.

It is to be noted that the above method is effective specifically when the print data is configured solely with W scale values. Optionally, following S3, the 256-scaled W data may be corrected if necessary based on a tone curve graph, which can be preliminarily obtained in experiences, and the like.

Figure 8:
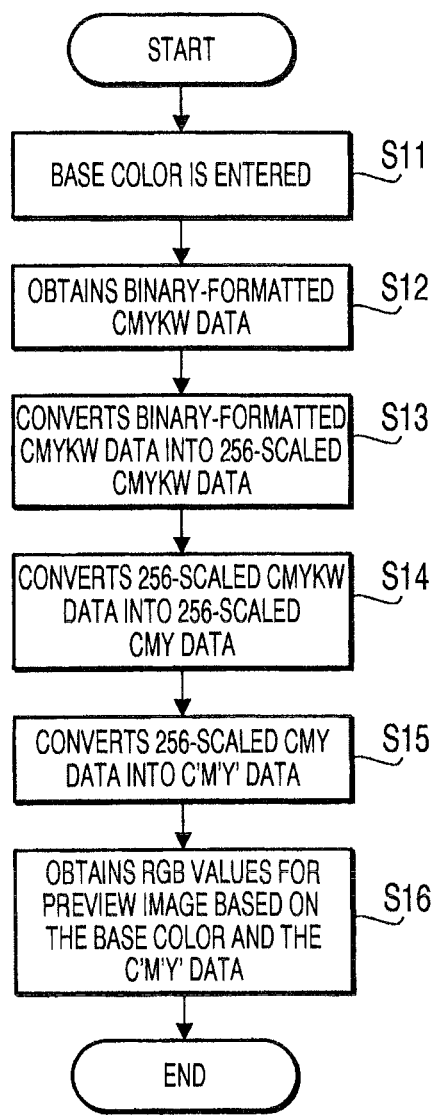
FIG. 8 is a flowchart to illustrate a preview data generating process to be executed in the PC according to a second embodiment of the present invention.

Next, a second method to generate preview data according to a second embodiment of the present invention will be described with reference to FIG. 8. FIG. 8 is a flowchart to illustrate the preview data generating process to be executed in the PC 100 according to the second embodiment of the present invention. When the preview data generating process starts, in S11, a color of a base layer entered through the print setting window 310 as shown in FIG. 7 is received. The print setting window 310 is closed after Ur, Ug, and Ub are entered. The entered values Ur, Ug, and Ub are stored in the base color data storing area 1126 of the RAM 112. The print setting window 310 is closed when an operation to the print set button 312 is entered.

In S12, binary-formatted CMYKW data is obtained. Specifically, the binary-formatted CMYKW data stored in the print data storing area 1124 of the RAM 112 is obtained. In S13, the obtained CMYKW data in the binary format is converted into 256-scaled CMYKW data. Specifically, a number of the binary-formatted W dots included in a plane divided in 8×8 (a dot being an inverse of a resolution of the image) is counted. The counted value is multiplied by 255/64. Similarly, numbers of the binary-formatted C, M, Y, K dots respectively included in a plane divided in 8×8 is counted and multiplied by 255/64. Thus, the 256-scaled CMYKW data is obtained.

Next, in S14, 256-scaled CMY data is extracted from the 256-scaled CMYKW to be converted into 256-scaled CMY data according to the following equations:

$C=C+K$ (When $C+K$ is greater than 255, C is set to be 255 ($C=255$).)

$M=M+K$ (When $M+K$ is greater than 255, M is set to be 255 ($M=255$).)

$Y=Y+K$ (When $Y+K$ is greater than 255, Y is set to be 255 ($Y=255$).)

In the CMY data, a black pixel can be represented by combination of C, M, Y scale values.

In S15, the 256-scaled CMY data extracted in S14 is converted with reference to a predetermined conversion table. The conversion table may be, for example, a known table which can be used when a base color is white to define correspondence between CMY scale values in print data without W scale values and RGB scale values for preview data. When the color conversion table 161 shown in FIG. 9, for example, is used to convert the 256-scaled RGB data into the 256-scaled CMY data upon generating the print data, the color conversion table 161 can be used as a reverse conversion table, by which the 256-scaled CMY data is converted into the 256-scaled RGB data. In the present embodiment, the converted results (R', G', B') according to the table are indicated as (R', G', B')=Table (C, M, Y). In S15, values (C', M', Y') are obtained according to the following equations:

$C'=255-R'$ $M'=255-G'$ $Y'=255-B'$.

Next, in S16, the base color (Ur, Ug, Ub) entered in S11 and the values (C', M', Y') obtained in S15 are applied to the following formulae 2 in order to obtain the RGB data for preview:

$$R = Ur\frac{255-w}{255} + W - C' \quad \text{(Formulae 2)}$$

(When R becomes smaller than 0, the R is set to be zero (R=0).)

$$G = Ug\frac{255-w}{255} + W - M'$$

(When G becomes smaller than 0, the G is set to be zero (G=0).)

$$B = Ub\frac{255-w}{255} + W - Y'$$

(When B becomes smaller than 0, the B is set to be zero (B=0).)

According to the above method, a preview image for print data including CMYKW scale values, in which coloration of the designated color information of the recording medium is reflected to the print data, is achieved.

Next, a third method to generate preview data according to a third embodiment of the present invention will be described. In the third embodiment, the RGB values obtained in S4 (FIG. 6) in the first embodiment are indicated as RGB=(R1, G1, B1), and the RGB values obtained in S16 (FIG. 8) in the second embodiment are indicated as RGB=(R2, G2, B3). These RGB values are combined and applied a predetermined opacity according to the following formulae, in which the opacity is indicated by F. The opacity F can range from 0 (i.e., transparent) to 1 (i.e., no transparency) and can be, for example, 0.8.

$$R = (1-F)R1 + F\frac{R1R2}{255} \quad \text{(Formulae 3)}$$

$$G = (1-F)G1 + F\frac{G1G2}{255}$$

$$B = (1-F)B1 + F\frac{B1B2}{255}$$

According to the above formulae with the predetermined opacity F being considered, a preview image for print data including CMYW scale values, in which coloration of the designated color information of the recording medium is affected, is achieved. The print data including the CMYW scale values represents an image by C, M, Y, and W scale values, and when the image is formed, a pixel to be painted in black is maintained unpainted with no ink being ejected thereon. Therefore, the CMYW print data can be effectively used when the recording medium is black.

Figures 10, 11:
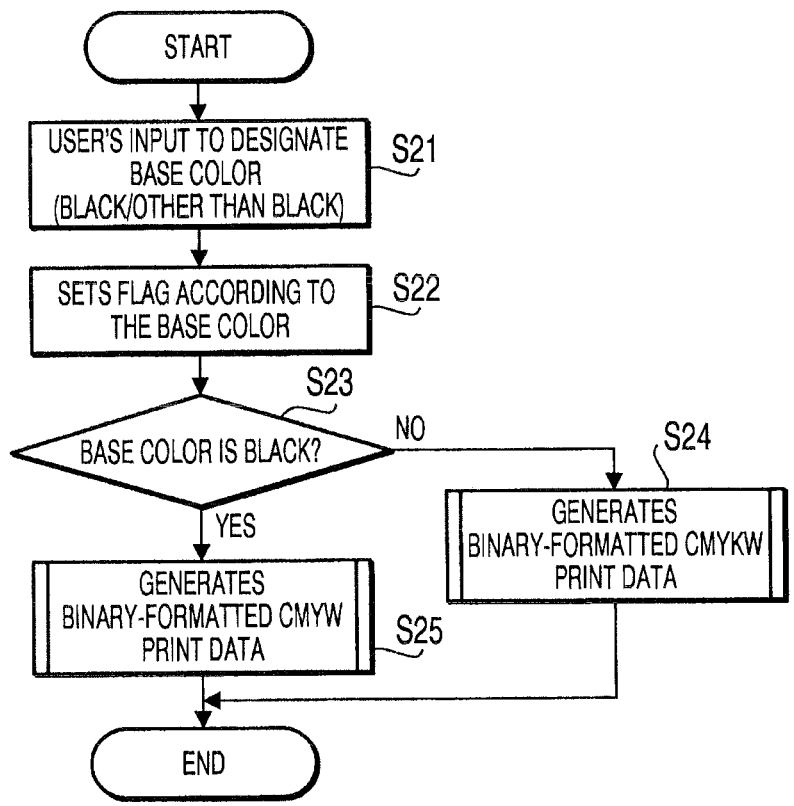
FIG. 10 illustrates configuration of the print data according to a fourth embodiment of the present invention.
FIG. 11 is a flowchart to illustrate behaviors of the PC according to the fourth embodiment of the present invention.
Figure 12:
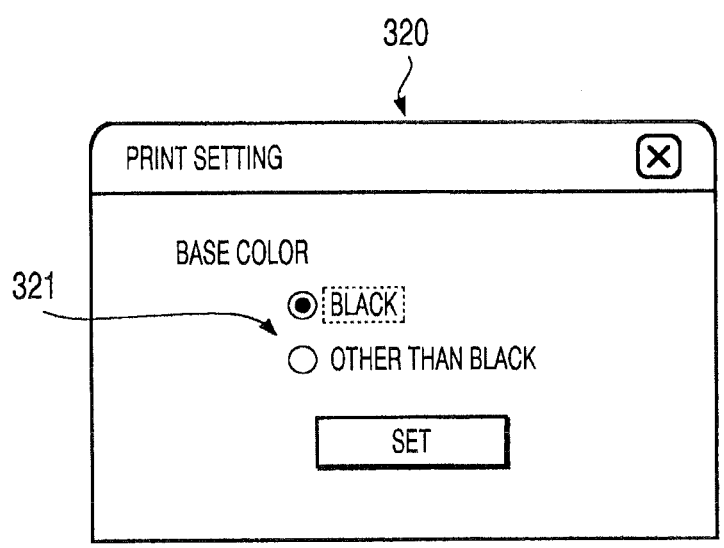
FIG. 12 illustrates a window to be displayed on the monitor screen of the PC according to the fourth embodiment of the present invention.
Figure 23:
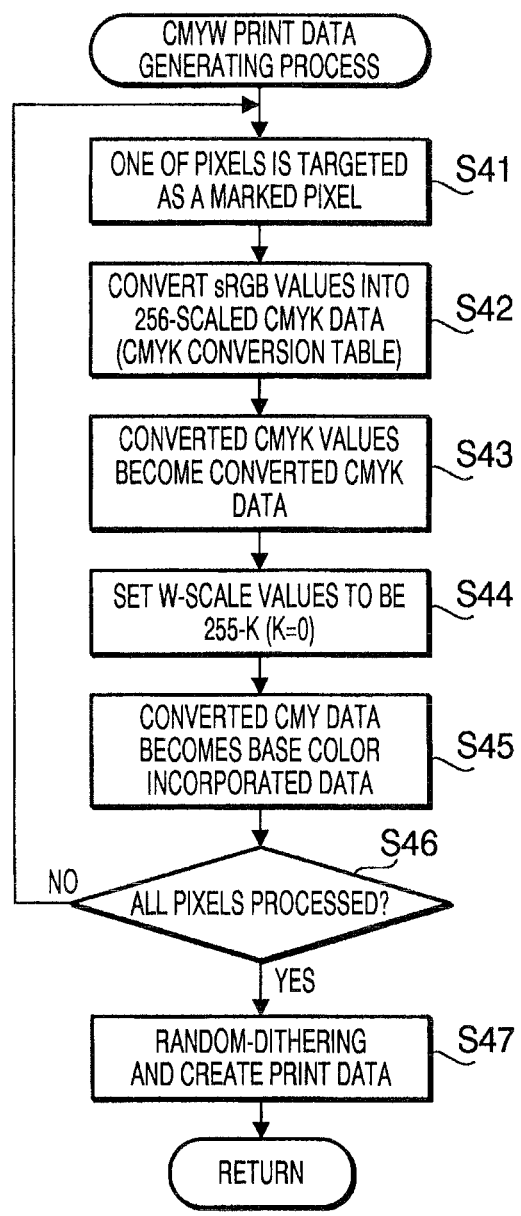
FIG. 23 is a flowchart to illustrate a CMYW print data generating process according to the embodiment of the present invention.
Figure 24:
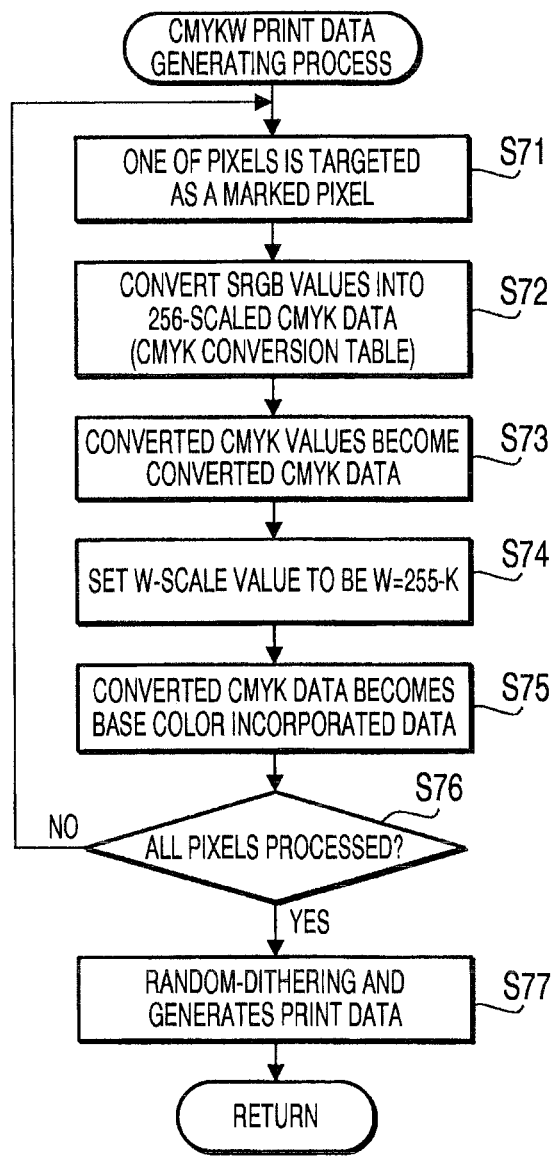
FIG. 24 is a flowchart to illustrate a CMYKW print data generating process according to the embodiment of the present invention.

Next, a fourth method to generate preview data according to a fourth embodiment of the present invention will be described with reference to FIGS. 10-12 and 23-24. FIG. 10 illustrates configuration of print data 170 according to the fourth embodiment of the present invention. FIG. 11 is a flowchart to illustrate behaviors of the PC 100 according to the fourth embodiment of the present invention. FIG. 12 illustrates a print setting window 320 to be displayed on the monitor screen of the PC 100 according to the fourth embodiment of the present invention. FIG. 23 is a flowchart to illustrate a CMYW print data generating process according to the embodiment of the present invention. FIG. 24 is a flowchart to illustrate a CMYKW print data generating process according to the embodiment of the present invention.

In the fourth embodiment, a method to generate the preview data to be employed can be switched between the preview data generating methods described above in the second embodiment (i.e., when the print data is CMYKW data) and the third embodiment (i.e., when the print data is CMYW data) depending on presence or absence of K data in the print data. That is, when black pixels in the print data are reproduced in K ink (i.e., when the print data is CMYKW data), the second embodiment is employed. When black pixels are reproduced in CMY inks being blended (i.e., when the print data is CMYW data), the third embodiment is employed. The method to generate print data for printing an image in white ink may be one of several conventionally-suggested methods. Therefore, an identifier to identify the method (i.e., CMYKW or CMYW) to generate the print data is included in the print data 170. When preview data is generated, the identifier is referred to in order to determine the method to generate the preview data so that the usage of black ink in addition to the coloration of the recording medium can be considered in the preview image.

With reference to FIGS. 11 and 12, behaviors of the PC 100 according to the printer driver will be described. When the printer driver is activated, a print setting window 320 shown in FIG. 12 is displayed on the screen of the monitor 133. The print setting window 320 includes color designation buttons 321, by which a color of the recording medium (i.e., a base color) being black or other than black can be designated. In S21, a user's input to designate the base color is received. In S22, if the base color is designated to be black, a flag in an initial byte (zeroth byte) in the print data is set to be 1. If the base color is designated to be other than black, a flag in the initial byte of the print data is set to be zero (0).

In S23, it is determined as to whether the base color is black based on the flag set in S22. When the base color is black (S23: YES), in S25, binary-formatted CMYW print data is generated. When the base color is other than black (S23: NO), in S24, binary-formatted CMYKW print data is generated.

In S25, a CMYW print data generating process as shown in FIG. 23 is performed. When the CMYW print data generating process starts, in S41, one of pixels which composes the image data is targeted as a currently marked pixel, and the sRGB values of the marked pixel is read out. Thereafter, in S42, the read-out sRGB values are converted into 256-scaled data in the CMYK format. In the conversion of the sRGB values, the color conversion table 161 (FIG. 9) stored in the color conversion table storing area 1163 of the HDD 116 is used. Thereafter, in S43, each of the CMYK scale values of the converted CMYK data is stored in the CMYK data storing area 1122 of the RAM 112.

Following S43, in S44, the W scale values are obtained based on the K scale values in the converted CMYK data and the equation "W=255−K." The obtained W scale values are set to be the W scale values in the base color incorporated data and stored in the base color incorporated data storing area 1123.

In S45, each of the CMY scale values of the converted CMYK data is stored in the base color incorporated data storing area 1123 of the RAM 112 to be the CMY scale values of the base color incorporated data. Thus, the base color incorporated data generated in the CMYW print data generating process is configured with the C, M, Y scale values in the converted CMYK data and the W scale values obtained by inverting the K scale values in the converted CMYK data. According to the CMYW print data generated in the above steps, areas to be reproduced in black are indicated by the K scale values being zero and visualized by not ejecting any ink onto the areas. Meanwhile, according to the converted CMYK data, the areas to appear black are reproduced by ejecting K ink on the areas. In S46, it is judged as to whether the above steps S41-45 are applied to all the pixels included in the image data. If a pixel remains unprocessed (S46: NO), the process returns to S41 and repeats S41-S46. If all the pixels are processed (S46: YES), in S47, a random dithering process is applied to the base color incorporated data. According to the random dithering process in S47, the base color incorporated data in 256-scale values is converted to binary-formatted CMYW print data. The process thereafter returns to the preview data generating process shown in FIG. 11.

Next, a CMYKW print data generating process as shown in FIG. 24 will be described. The CMYKW print data generating process is performed when the base color is determined to be other than black in S23 (S23: NO).

When the CMYKW print data generating process starts, in S71, one of pixels which composes the image data is targeted as a currently marked pixel and the sRGB values of the marked pixel is read out. Thereafter, in S72, the read-out sRGB values are converted into 256-scaled data in the CMYK format with reference to the color conversion table 161 (FIG. 9) stored in the color conversion table storing area 1163 of the HDD 116. Thereafter, in S73, each of the CMYK scale values of the converted CMYK data is stored in the CMYK data storing area 1122 of the RAM 112.

Following S73, in S74, the W scale values are obtained based on the K scale values in the converted CMYK data and the equation "W=255−K." The obtained W scale values are set to be the W scale values in the base color incorporated data and stored in the base color incorporated data storing area 1123.

In S75, each of the CMYK scale values of the converted CMYK data is stored in the base color incorporated data storing area 1123 of the RAM 112 to be the CMYK scale values of the base color incorporated data. Thus, the base color incorporated data generated in the CMYKW print data generating process is configured with the C, M, Y, K scale values in the converted CMYK data and the W scale values obtained by inverting the K scale values in the converted CMYK data. According to the CMYKW data obtained in the above steps S71-75, the areas to appear black are reproduced by ejecting K ink on the areas. In S76, it is judged as to whether the above steps S71-75 are applied to all the pixels included in the image data. If a pixel remains unprocessed (S76: NO), the process returns to S71 and repeats S71-S76. If all the pixels are processed (S76: YES), in S77, a random dithering process is applied to the base color incorporated data. According to the random dithering process in S77, the base color incorporated data in 256-scale values is converted to binary-formatted CMYKW print data. The process thereafter returns to the preview data generating process shown in FIG. 11.

Thus, when the preview data is generated, the flag set in the print data indicating the base color (i.e., black or other than black) is referred to in order to determine the method to generate the preview data between the methods described in the second and the third embodiments. Namely, when the flag indicating the base color being other than black is set (S23: NO), the preview data is generated according to the second embodiment, and when the flag indicating the base color being black is set (S23: YES), the preview data is generated according to the third embodiment.

Figure 13:
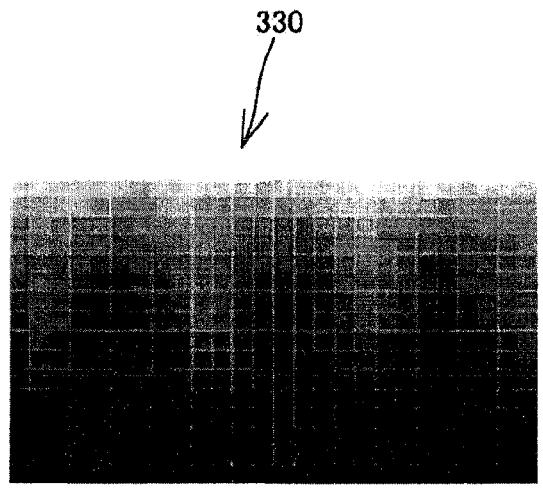
FIG. 13 illustrates a preview image to be displayed according to the embodiments of the present invention.

Next, a fifth method to generate preview data according to a fifth embodiment of the present invention will be described with reference to FIGS. 13-20. FIG. 13 illustrates the originally inputted image, and FIGS. 14-20 illustrate preview windows to be displayed on the screen of the monitor 133 according to the fifth embodiment of the present invention. When an instruction for displaying a print preview of the image shown in FIG. 13 is entered through an application program running on the PC 100, the preview windows 340, 350, 360, 370, 380, 390, and 400 shown in FIGS. 14-20 respectively can be displayed depending on preview settings.

Figure 14:
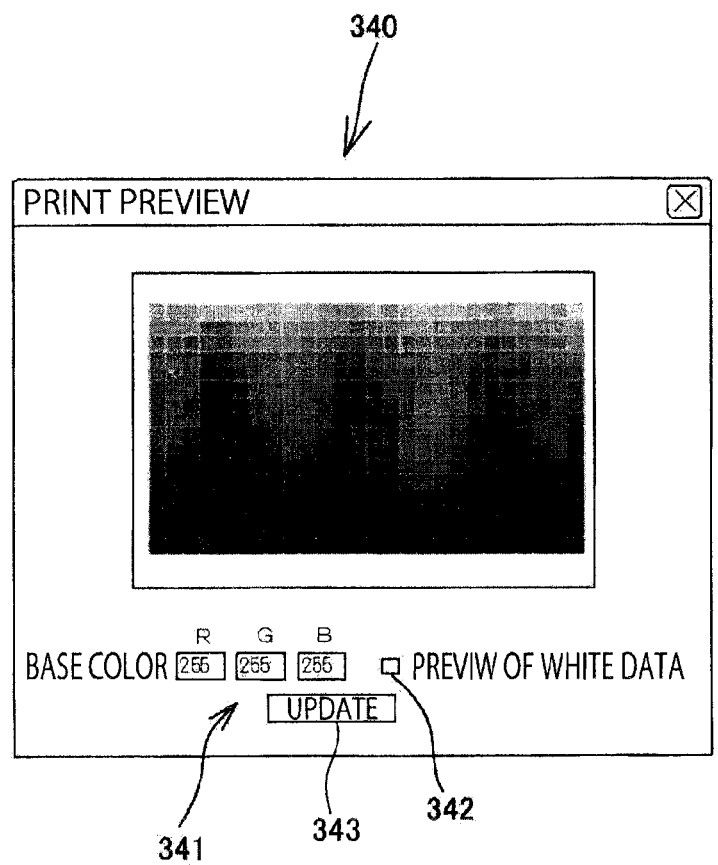
FIG. 14 illustrates a preview window to be displayed according to the embodiments of the present invention.

In FIG. 14, the preview window 340 includes RGB input fields 341, a W data preview checkbox 342, and an update button 343. R, G, B scale values of the base color can be entered in the RGB input fields 341. The W data preview checkbox 342 is checked when a preview image based on W data, excluding the CMYK data, in the image 330 is requested. When the update button 343 is operated, the necessary settings set in the RGB input fields 341 and the W data preview checkbox 342 are entered, and preview data in which the settings made in the RGB input fields 341 and the W data preview checkbox 342 are reflected is generated to be displayed in the preview window 340.

In the preview window 340, the RGB scale values (255, 255, 255) are entered in the RGB input fields 341. It is to be noted that when the W ink is used to form an image on a colored recording medium, the image is firstly formed in white before the other CMYK colored inks are used. Therefore, the preview image of W data only may be required. When the user requires the preview image of W ink only, the user places a checkmark in the W data preview checkbox 342. In the preview window 340, no checkmark is placed in the W data preview checkbox 342; therefore, a preview image of W data only is not required. It is to be noted that the print data to be previewed in the preview image being generated includes K data in consideration of a color of the recording medium, which is other than black. In these settings, preview data is generated based on the binary-formatted CMYKW data according to the method described in the second embodiment. The preview image according to the generated preview data is displayed in the preview window 340.

The preview windows 350, 360, 370, 380, 390, and 400 shown in FIGS. 14-20 respectively include RGB input fields 351, 361, 371, 381, and 401, which function identically to the RGB input fields 341. Further, W data preview checkboxes 352, 362, 372, 382, 392, and 402, identical to the W data preview checkbox 342, are included, and update buttons 353, 363, 373, 383, 393, and 403, identical to the update button 343, are included.

Figure 15:
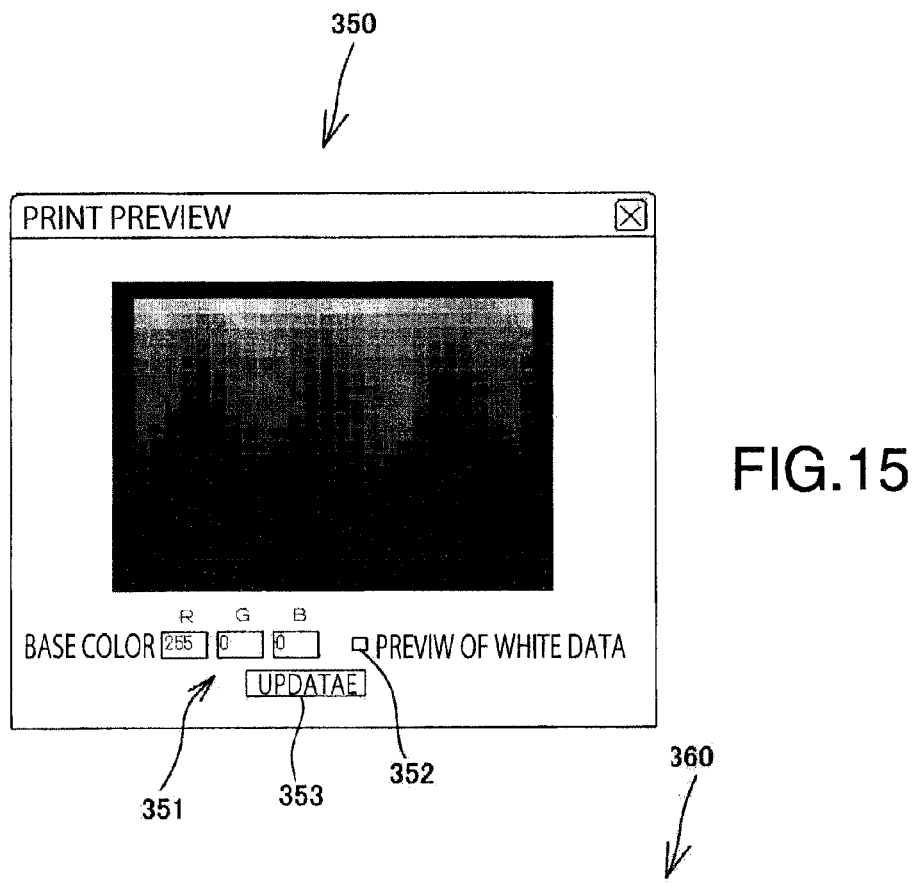
FIG. 15 illustrates a preview window to be displayed according to the embodiments of the present invention.

In the preview window 350 shown in FIG. 15, the RGB scale values (255, 0, 0) are entered in the RGB input fields 351. Further, no checkmark is placed in the W data preview checkbox 352. The print data to be previewed in the preview image being generated includes K data in consideration of the color of the recording medium, which is other than black. In these settings, preview data is generated based on the binary-formatted CMYKW data according to the method described in the second embodiment. The preview image according to the generated preview data is displayed in the preview window 350.

Figure 16:
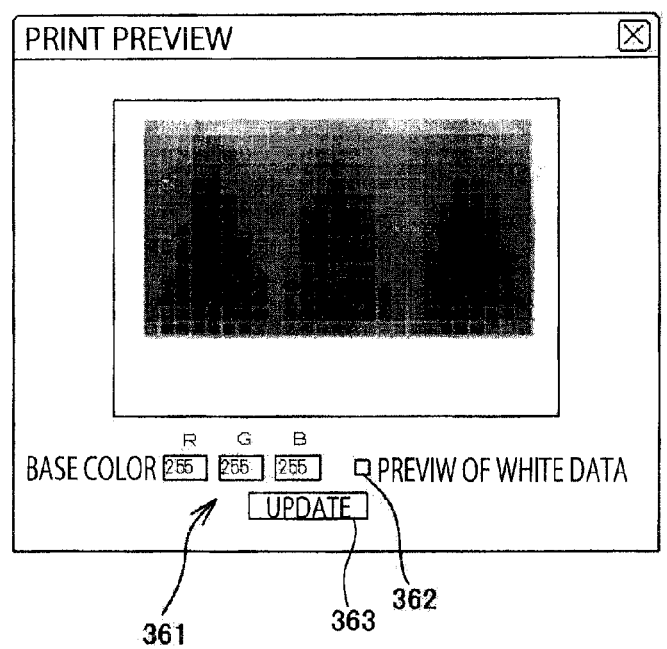
FIG. 16 illustrates a preview window to be displayed according to the embodiments of the present invention.

In the preview window 360 shown in FIG. 16, the RGB scale values (255, 255, 255) are entered in the RGB input fields 361. Further, no checkmark is placed in the W data preview checkbox 362. The print data to be previewed in the preview image being generated does not include K data. In these settings, preview data is generated based on the binary-formatted CMYKW data according to the method described in the third embodiment. It has been known by experiments that the more preferable method to generate the preview data is that described in the third embodiment rather than the methods in the other embodiments. The preview image according to the generated preview data is displayed in the preview window 360.

Figure 17:
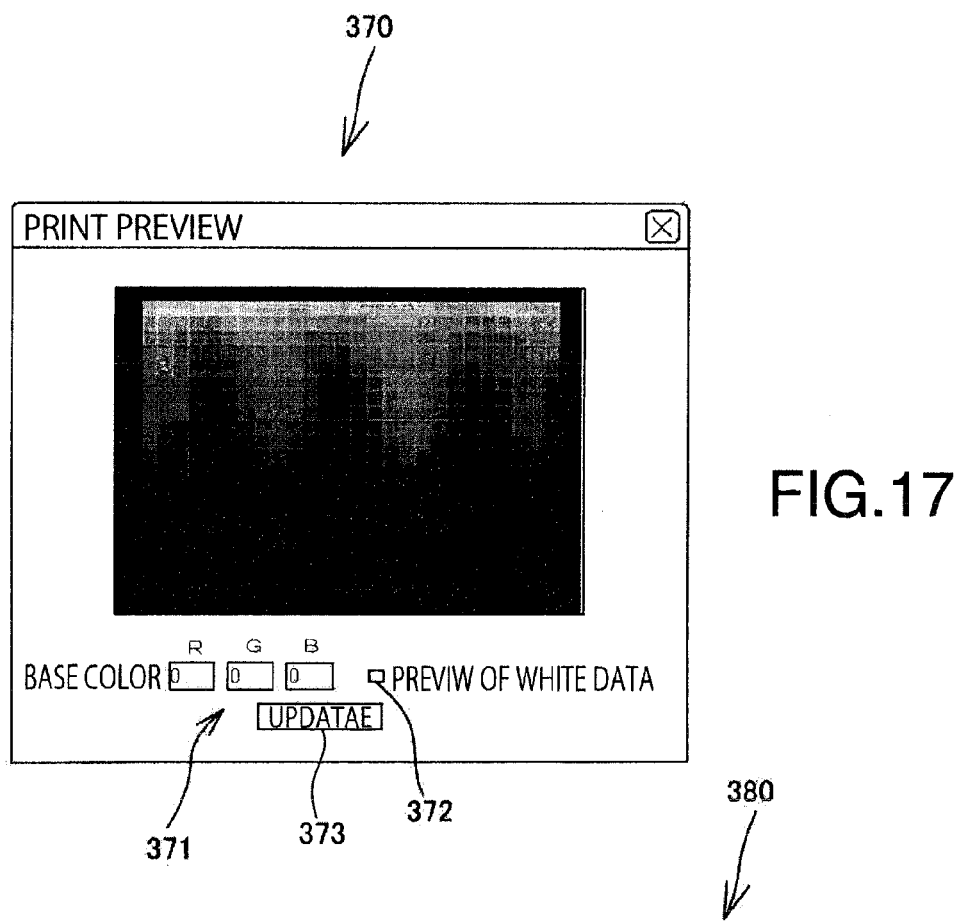
FIG. 17 illustrates a preview window to be displayed according to the embodiments of the present invention.

In the preview window 370 shown in FIG. 17, the RGB scale values (0, 0, 0) are entered in the RGB input fields 371. Further, no checkmark is placed in the W data preview checkbox 372. The print data to be previewed in the preview image being generated does not include K data. In these settings, preview data is generated based on the binary-formatted CMYKW data according to the method described in the third embodiment. It has been known by experiments that the more preferable method to generate the preview data is that described in the third embodiment rather than the methods in the other embodiments. The preview image according to the generated preview data is displayed in the preview window 370.

Figure 18:
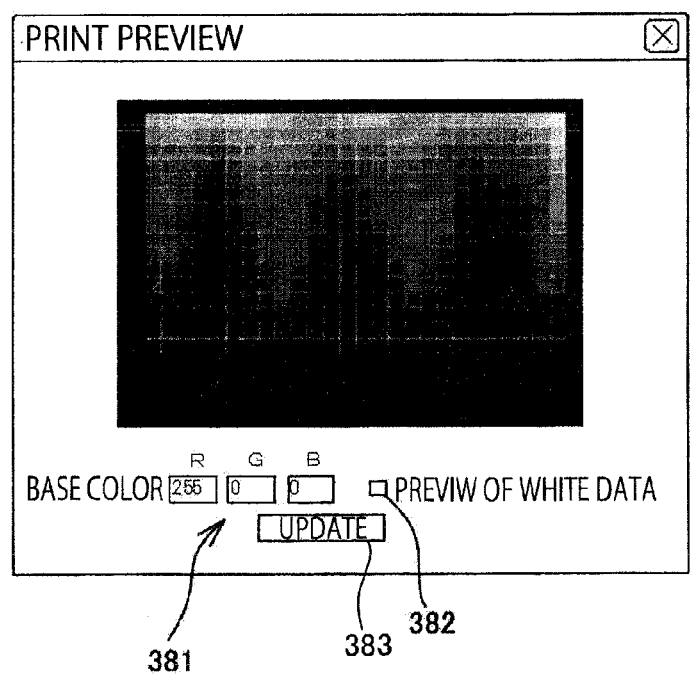
FIG. 18 illustrates a preview window to be displayed according to the embodiments of the present invention.

In the preview window 380 shown in FIG. 18, the RGB scale values (255, 0, 0) are entered in the RGB input fields 381. Further, no checkmark is placed in the W data preview checkbox 382. The print data to be previewed in the preview image being generated does not include K data. In these settings, preview data is generated based on the binary-formatted CMYKW data according to the method described in the third embodiment. It has been known by experiments that the more preferable method to generate the preview data is that described in the third embodiment rather than the methods in the other embodiments. The preview image according to the generated preview data is displayed in the preview window 380.

Figure 19:
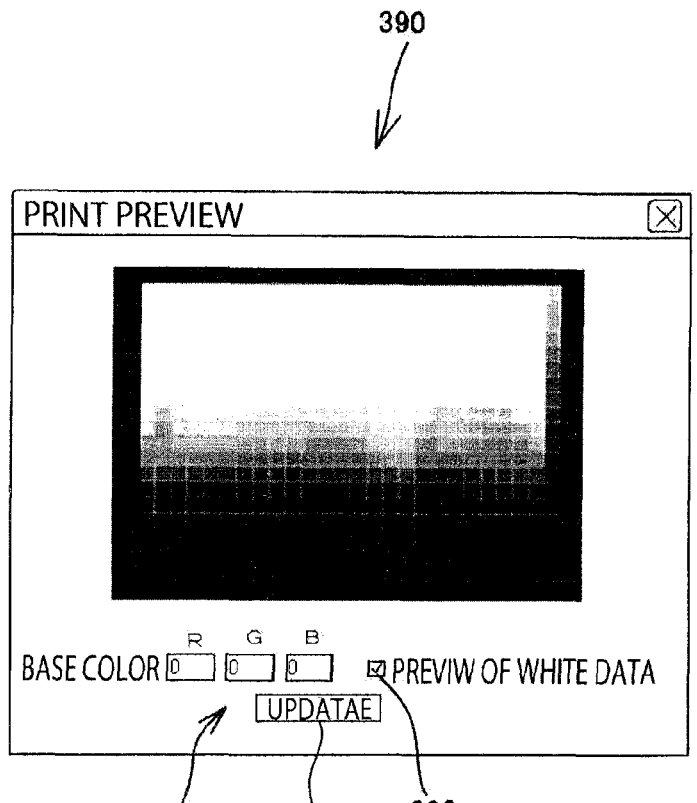
FIG. 19 illustrates a preview window to be displayed according to the embodiments of the present invention.

In the preview window 390 shown in FIG. 19, the RGB scale values (0, 0, 0) are entered in the RGB input fields 391. Further, a checkmark is placed in the W data preview checkbox 392. Therefore, a preview image of W data is required. The print data to be previewed in the preview image being generated may or may not include K data. In these settings, preview data is generated based on the binary-formatted W data extracted from the binary-formatted CMYKW data according to the method described in the first embodiment. It has been known by experiments that the more preferable method to generate the preview data is that described in the first embodiment rather than the methods in the other embodiments. The preview image according to the generated preview data is displayed in the preview window 390.

Figure 20:
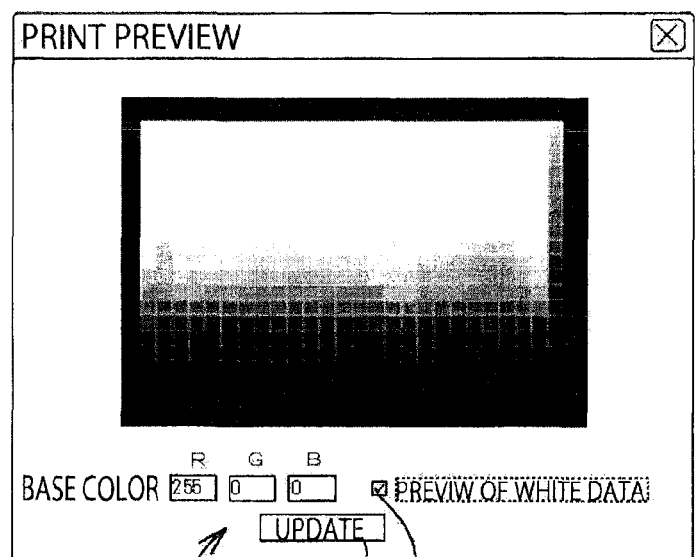
FIG. 20 illustrates a preview window to be displayed according to the embodiments of the present invention.

In the preview window 400 shown in FIG. 20, the RGB scale values (255, 0, 0) are entered in the RGB input fields 401. Further, a checkmark is placed in the W data preview checkbox 402. Therefore, a preview image of W data is required. The print data to be previewed in the preview image being generated does not include K data. In these settings, preview data is generated based on the binary-formatted W data extracted from the binary-formatted CMYKW data according to the method described in the first embodiment. It has been known by experiments that the more preferable method to generate the preview data is that described in the first embodiment rather than the methods in the other embodiments. The preview image according to the generated preview data is displayed in the preview window 400.

Figure 21:
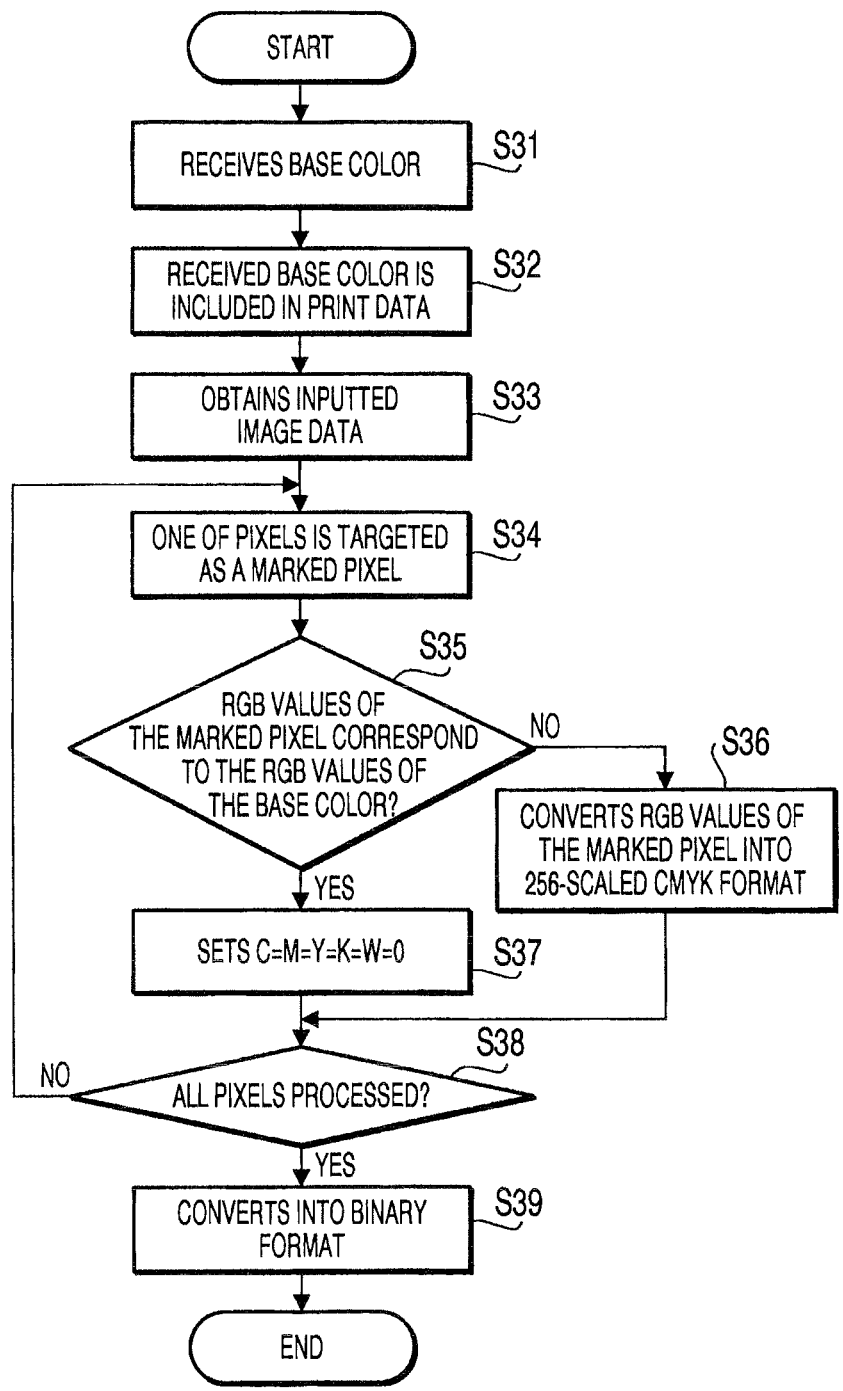
FIG. 21 is a flowchart to illustrate behaviors of the PC according to a sixth embodiment of the present invention.

Next, a sixth method to generate preview data according to a sixth embodiment of the present invention will be described with reference to FIGS. 21, 22. FIG. 21 is a flowchart to illustrate behaviors of the PC 100 according to a sixth embodiment of the present invention. FIG. 22 illustrates configuration of the print data 171 according to the sixth embodiment of the present invention.

Behaviors of the PC 100 according to the sixth embodiment will be described with reference to FIG. 21. When the printer driver is activated in the PC 100, the print setting window 310 is displayed on the screen of the monitor 133. In S31, a base color entered through the print setting window 310 as shown in FIG. 7 is received. The base color can be entered in RGB scale values ranging from 0 to 255. The entered RGB scale values are stored in the base color data storing area 1126 of the RAM 112. The print setting window 310 is closed when the RGB scale values are received according to the user's input.

In S32, the received RGB scale values are added in the print data. Specifically, the R scale value of the base color is set in the zeroth byte in the print data 171 shown in FIG. 22. The G scale value of the base color is set in the first byte in the print data 171. The B scale value of the base color is set in the second byte in the print data 171.

In S33, RGB scale values of the inputted image data stored in the image data storing area 1164 are obtained. In S34, one of pixels which compose the inputted image data is targeted as a currently marked pixel, and the RGB scale values of the marked pixel are obtained. In S35, it is examined as to whether the RGB scale values of the marked pixel correspond to the RGB scale values of the base color. If the RGB scale values of the marked pixel correspond to the RGB scale values of the base color (S35: YES), in S36, each of the CMYKW scale values for the marked pixel is set to be zero (C=M=Y=K=W=0).

In S35, if the RGB scale values of the marked pixel do correspond to the RGB scale values of the base color (S35: NO), in S36, the RGB scale values of the marked pixel are converted into corresponding CMYKW scale values in 256 scales in a conventional converting method.

Following S36 or S37, in S38, it is examined as to whether the above steps S34-S37 are applied to all the pixels included in the image data. If a pixel remains unprocessed (S38: NO), the process returns to S34, and a next pixel is targeted as a marked pixel. If all the pixels are processed (S38: YES), in S39, the 256-scaled CMYKW data is converted into binary-formatted CMYKW data.

When the preview data is generated based on the binary-formatted CMYKW data generated in S39, the print data 171 with the data structure shown in FIG. 22 is processed to be previewed with the RGB scale values of the base color entered in S31.

According to the above embodiments, preview data representing a preview image, in which a color of the recording medium is reflected, can be created. Although examples of carrying out the invention have been described, those skilled in the art will appreciate that there are numerous variations and permutations of the preview data generating apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the print data to be created may not necessarily be in the binary format, but may be quaternary-formatted data indicating sizes of an ink drop to be ejected, which are large, medium, small, and no ejection. In such a data format, a value of a dot in the 8×8 plane is one of 0, 1, 2, and 3; therefore, a maximum allowable value for the total dots is 192 (i.e., 3×64). Accordingly, by multiplying a number of dots included in the 8×8 planes by 255/192, print data in 256 scales can be obtained. It is to be noted that the data format of print data can be other than quaternary.

For another example, the print data may not necessarily be in the CMYKW format, and inks to be used for the image to be previewed may include other light inks. When such colored inks are included, a predetermined CMY conversion table can be used in order to obtain the print data in CMY scales.

What is claimed is:

1. A preview data generating apparatus configured to generate preview data, which is used to display a preview image representing an image to be printed on a recording medium, in reflection of a color of the recording medium, comprising:

a base color input unit configured to input a base color being the color of the recording medium;

a print data input unit configured to input print data in a printable format, which is used to print the image;

a data conversion unit configured to convert the print data into a displayable format suitable for a display device; and a base color incorporated data generating unit to generate the preview data representing the image to be printed by incorporating the displayable-formatted data and the base color, wherein the base color incorporated data generating unit generates white preview data representing whiteness of the preview image;

wherein the print data input unit inputs scale values for a plurality of colors of pixels included in the print data, the plurality of colors including white;

wherein the data conversion unit converts the scale values for the plurality of colors of pixels inputted by the print data input unit into scale values for the colors of pixels in the displayable format;

wherein the preview data generated by the base color incorporated data generating unit is configured with R, G, B color components, which are red, green, and blue respectively;

wherein the preview data generating apparatus further comprises an extractor unit to extract scale values of C, M, Y colors, which are cyan, magenta, and yellow respectively, from the print data to convert into CMY data; and wherein the base color incorporated data generating unit generates colored preview data, which represents a multi-colored preview image, by:

subtracting the extracted scale value of the C color from the scale value of the R color component in the white preview data;

subtracting the extracted scale value of the Y color from the scale value of the B color component in the white preview data; and subtracting the extracted scale value of the M color from the scale value of the G color component in the white preview data.

2. The preview data generating apparatus according to claim 1, wherein the print data input unit inputs scale values for whiteness of pixels included in the print data;

wherein the data conversion unit converts the scale values for whiteness of pixels inputted by the print data input unit into scale values for whiteness in the displayable format; and wherein the base color incorporated data generating unit generates the white preview data representing whiteness of the preview image with the base color incorporated based on the scale values for whiteness of pixels in the displayable-formatted data and the base color so that:

a scale value of whiteness of a pixel in the white preview data becomes maximum when a scale value of whiteness of a corresponding pixel in the print data indicates maximum;

a scale value of whiteness of a pixel in the white preview data becomes lower to be closer to the color of the recording medium as a scale value of whiteness of a corresponding pixel in the print data diminishes; and a scale value of whiteness of a pixel in the white preview data becomes minimum when a scale value of whiteness of a corresponding pixel in the print data indicates minimum.

3. The preview data generating apparatus according to claim 2,
wherein the base color input unit inputs the base color in scale values of R, G, and B;
wherein the print data input unit inputs the print data in a binary-format;
wherein the data conversion unit converts the binary-formatted print data indicating the binary scale values of whiteness into 256-scaled displayable-formatted data indicating the scale values of whiteness in 256 scales; and
wherein the base color incorporated data generating unit generates the white preview data based on the 256-scaled displayable-formatted data converted by the data conversion unit and the scale values of the RGB of the base color inputted by the base color input unit.

4. The preview data generating apparatus according to claim 1,
wherein the print data input unit inputs binary-scaled CMYKW-formatted print data, which includes scale values of C, M, Y, K, W colors, which are cyan, magenta, yellow, black, and white;
wherein the data conversion unit converts the binary-scaled CMYKW print data into 256-scaled CMYKW displayable data;
wherein the extractor unit converts the 256-scaled CMYKW displayable data into 256-scaled CMY data, in which scale values of the CMYK colors in the 256-scaled CMYKW displayable data are represented in CMY colors and the K color is represented in combination of the CMY colors;
wherein the base color incorporated data generating unit generates the colored preview data in the scale values of RGB by converting the 256-scaled CMY data with reference to a predetermined color conversion table.

5. The preview data generating apparatus according to claim 1,
wherein the base color incorporated data generating unit includes a preview data combining unit to generate combined preview data, in which the white preview data and the colored preview data are combined.

6. The preview data generating apparatus according to claim 5,
wherein the preview data combining unit combines the white preview data and the colored preview data through a multiplying process.

7. The preview data generating apparatus according to claim 6, wherein the activation of the preview data combining unit is switchable based on presence and absence of K data, which indicates color scales of the K color in the print data.

8. The preview data generating apparatus according to claim 7,
wherein the preview data combining unit is activated when the K data is included in the print data.

9. The preview data generating apparatus according to claim 1, comprising a preview data selection unit by which one of the white preview data and the colored preview data to be generated by the base color incorporated data generating unit is selected.

10. The preview data generating apparatus according to claim 1, wherein the print data includes information concerning the base color.

11. A method to generate preview data, which is to be used to display a preview image representing an image to be printed on a recording medium, in reflection of a color of the recording medium; comprising:
inputting a base color being the color of the recording medium;
inputting print data in a printable format, which is used to print the image, by inputting scale values for a plurality of colors of pixels included in the print data, the plurality of colors including white;
converting the print data into a displayable format suitable for a display device by converting the scale values for the plurality of colors of pixels inputted by the print data input unit into scale values for the colors of pixels in the displayable format;
extracting scale values of C, M, Y colors, which are cyan, magenta, and yellow respectively, from the print data to convert into CMY data;
generating white preview data representing whiteness of the preview image; and
generating the preview data representing the image to be printed by incorporating the displayable-formatted data and the base color, the preview data being configured with R, G, B color components, which are red, green, and blue respectively, the generating occurring by:
subtracting the extracted scale value of the C color from the scale value of the R color component in the white preview data;
subtracting the extracted scale value of the Y color from the scale value of the B color component in the white preview data; and
subtracting the extracted scale value of the M color from the scale value of the G color component in the white preview data.

12. A non-transitory computer usable medium to comprise computer readable instructions to control a computer to generate preview data, which is to be used to display a preview image representing an image to be printed on a recording medium, in reflection of a color of the recording medium, by executing steps of:
inputting a base color being the color of the recording medium;
inputting print data in a printable format, which is used to print the image by inputting scale values for a plurality of colors of pixels included in the print data, the plurality of colors including white;
converting the print data into a displayable format suitable for a display device by converting the scale values for the plurality of colors of pixels inputted by the print data input unit into scale values for the colors of pixels in the displayable format;
extracting scale values of C, M, Y colors, which are cyan, magenta, and yellow respectively, from the print data to convert into CMY data;
generating white preview data representing whiteness of the preview image; and
generating the preview data representing the image to be printed by incorporating the displayable-formatted data and the base color, the preview data being configured with R, G, B color components, which are red, green, and blue respectively, the generating occurring by:
subtracting the extracted scale value of the C color from the scale value of the R color component in the white preview data;

subtracting the extracted scale value of the Y color from the scale value of the B color component in the white preview data; and subtracting the extracted scale value of the M color from the scale value of the G color component in the white preview data.

* * * * *